United States Patent
Ooba

(10) Patent No.: US 11,161,239 B2
(45) Date of Patent: Nov. 2, 2021

(54) WORK ROBOT SYSTEM AND WORK ROBOT

(71) Applicant: FANUC CORPORATION, Yamanashi (JP)

(72) Inventor: Masafumi Ooba, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 292 days.

(21) Appl. No.: 16/382,785

(22) Filed: Apr. 12, 2019

(65) Prior Publication Data
US 2019/0321967 A1    Oct. 24, 2019

(30) Foreign Application Priority Data

Apr. 23, 2018   (JP) .............................. JP2018-082405

(51) Int. Cl.
*G06F 7/00*      (2006.01)
*B25J 9/00*      (2006.01)
*B25J 9/16*      (2006.01)

(52) U.S. Cl.
CPC .......... *B25J 9/0093* (2013.01); *B25J 9/1633* (2013.01); *B25J 9/1692* (2013.01)

(58) Field of Classification Search
USPC ........................................ 700/213, 228–230
See application file for complete search history.

(56) References Cited

U.S. PATENT DOCUMENTS

| 4,954,762 A | 9/1990 | Miyake et al. |
| 2006/0111810 A1* | 5/2006 | Kim ..................... B25J 19/0091 700/186 |
| 2007/0073439 A1 | 3/2007 | Habibi et al. |
| 2010/0017033 A1 | 1/2010 | Boca |
| 2013/0006423 A1* | 1/2013 | Ito ........................ B25J 9/1612 700/259 |

(Continued)

FOREIGN PATENT DOCUMENTS

| EP | 0381185 A2 | 8/1990 |
| JP | S61243514 A | 10/1986 |

(Continued)

OTHER PUBLICATIONS

U.S. Appl. No. 16/382,773, filed Apr. 12, 2019, entitled, "Work Robot System and Work Robot".

(Continued)

*Primary Examiner* — Yolanda R Cumbess
(74) *Attorney, Agent, or Firm* — Karceski IP Law, PLLC

(57) ABSTRACT

A work robot system includes, a work robot and a work robot control unit that perform work on a target part of an object conveyed by a conveyer device, a measurement robot, a sensor that is attached to the measurement robot and that detects a position of a detection target of the object conveyed by the conveyer device, a measurement robot control unit that moves, through control of the measurement robot, the sensor in accordance with conveyance of the object, in order to detect the position, and a force detector that is used when force control is performed. When the work robot performs the work, the work robot control unit performs force control while performing control of the work robot based on a detection result of the sensor.

7 Claims, 10 Drawing Sheets

(56) References Cited

U.S. PATENT DOCUMENTS

| | | | | |
|---|---|---|---|---|
| 2013/0211766 A1* | 8/2013 | Rosenberg | ............ | G01B 21/16 702/97 |
| 2015/0005923 A1 | 1/2015 | Gu | | |
| 2018/0370023 A1 | 12/2018 | Ooba | | |

FOREIGN PATENT DOCUMENTS

| JP | S63260781 A | 10/1988 |
|---|---|---|
| JP | H02202606 A | 8/1990 |
| JP | H03155712 A | 7/1991 |
| JP | H08072764 A | 3/1996 |
| JP | H08286701 A | 11/1996 |
| JP | 2000296487 A | 10/2000 |
| JP | 2009509779 A | 3/2009 |
| JP | 2015009324 A | 1/2015 |
| JP | 2019005856 A | 1/2019 |
| WO | 2007035943 A2 | 3/2007 |

OTHER PUBLICATIONS

Japanese Notice of Reasons for Refusal dated Jun. 23, 2020 for Japanese Patent Application No. 2018082405.
Japanese Search Report by Registered Search Organization dated Jun. 23, 2020 for Japanese Patent Application No. 2018082405.

* cited by examiner

WORK ROBOT SYSTEM AND WORK ROBOT

CROSS-REFERENCE TO RELATED APPLICATIONS

This application is based on and claims priority to Japanese Patent Application No. 2018-082405, filed on Apr. 23, 2018, the content of which is incorporated herein by reference in its entirety.

FIELD OF THE INVENTION

The present invention relates to a work robot system and a work robot.

BACKGROUND OF THE INVENTION

In the related art, when a component is assembled in an object conveyed by a conveyer device, the conveyer device is stopped in many cases. In particular, when a component is to be precisely assembled in a large object, such as a vehicle body, conveyance of the object performed by a conveyer device needs to be stopped. This results in a reduction in work efficiency, in some cases.

On the other hand, there is a known production line that is provided with a robot, a conveyer device that conveys an object, a rail that is provided along the conveyer device, and a moving device that moves the robot along the rail (cf. Japanese Unexamined Patent Application, Publication No. H08-72764). In this production line, while the object is being conveyed by the conveyer device, the robot performs defect inspection and polishing on the object. Furthermore, when the defect inspection and the polishing are performed, the moving device moves the robot along the rail at the same speed as the conveying speed of the object conveyed by the conveyer device.

SUMMARY OF THE INVENTION

According to a first aspect, the present invention provides a work robot system including: a conveyer device that conveys an object; a work robot that performs predetermined work on a target part of the object conveyed by the conveyer device; a work robot control unit that controls the work robot; a sensor that is used for detecting a position of the target part or a detection target, whose position does not change with respect to the target part, on the object conveyed by the conveyer device; a measurement robot that can move the sensor in order to detect the position; a measurement robot control unit that controls the measurement robot; and a force detector that detects a force generated by a contact between a component or a tool that is supported by the work robot and the object, wherein, when the predetermined work is performed by the work robot, the work robot control unit performs force control based on a detection value of the force detector, while performing control of the work robot based on the detected position of the target part or the detection target.

According to a second aspect, the present invention provides a work robot including: an arm that performs predetermined work on a target part of an object conveyed by a conveyer device; a work robot control unit that controls the arm; and a force detector that detects a force generated by a contact between a component or a tool that is supported by the arm and the object, wherein the work robot control unit receives, from a measurement robot that has a sensor used for detecting a position of the target part, which is moved by the conveyer device, or a detection target whose position does not change with respect to the target part, data about the position; and, when the predetermined work is performed by the arm, the work robot control unit performs force control based on a detection value of the force detector, while performing control of the arm using the data about the position.

DESCRIPTION OF EMBODIMENT(S) OF THE INVENTION

A work robot system according to a first embodiment of the present invention will be described below with reference to the drawings.

Figure 1:
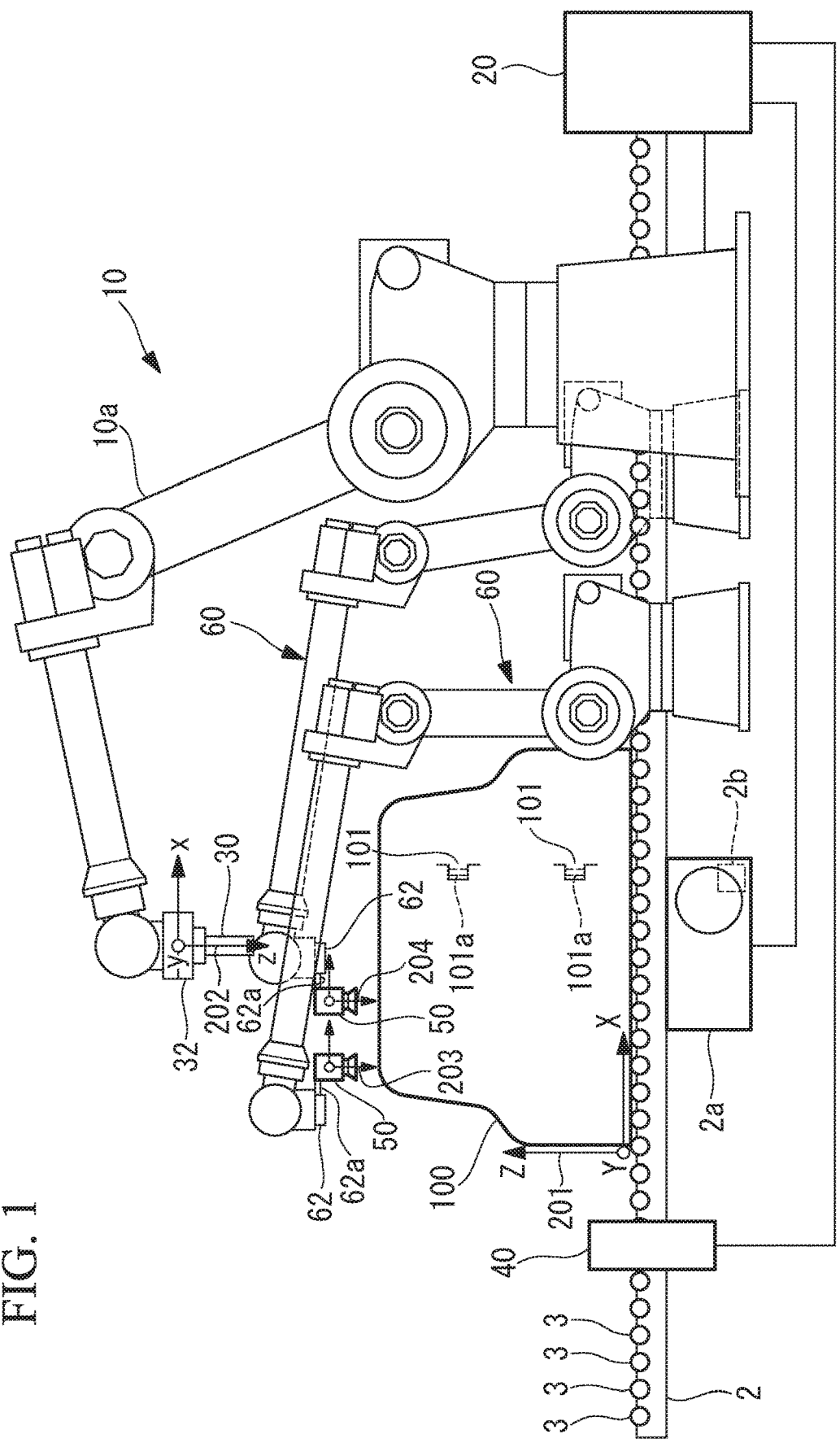
FIG. 1 is a view showing the configuration of a work robot system according to one embodiment of the present invention.
Figure 2:
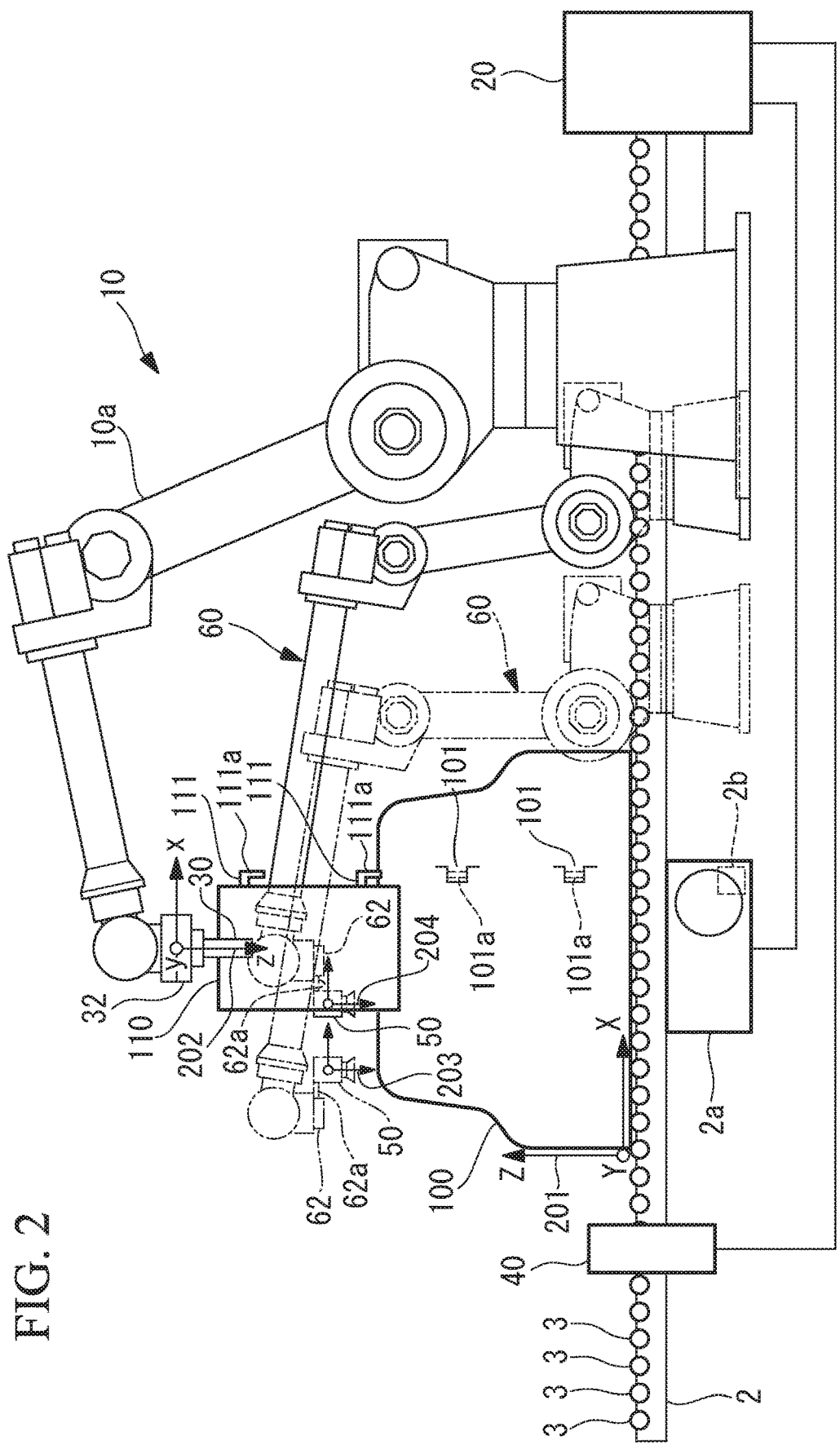
FIG. 2 is a view showing the configuration of the work robot system of this embodiment.

As shown in FIGS. 1 and 2, the work robot system of this embodiment is provided with: a conveyer device 2 that conveys an object 100 serving as a work target; a work robot 10 that performs predetermined work on target parts 101 of the object 100 conveyed by the conveyer device 2; a work robot controller 20 provided for the work robot 10; and a detection device 40 that serves as a detection unit.

The detection device 40 detects that the object 100 has been conveyed to a predetermined position. The detection device 40 may acquire data with which it is possible to identify the position and orientations of the target parts 101 of the object 100, which is conveyed by the conveyer device 2. Any device that has such a function can be used as the detection device 40. In this embodiment, the detection device 40 is a photoelectric sensor. In this case, the detection device 40 detects that the object 100 has been conveyed to the position where the detection device 40 is installed. A detection result of the detection device 40 may be sent to each controller or may be sent to a host controller 80, to be described later.

Although the object 100 is not limited to an object of a particular type, in this embodiment, the object 100 is a vehicle body as an example. The conveyer device 2 conveys the object 100 when a motor 2a drives some of a plurality of rollers 3, and, in this embodiment, the conveyer device 2 conveys the object 100 toward the right side in FIGS. 1 and 2. Note that the motor 2a may also be provided with an operation position detecting device 2b. The operation position detecting device 2b sequentially detects the rotational position and the amount of rotation of an output shaft of the motor 2a. The operation position detecting device 2b is, for example, an encoder, and a detection value of the operation position detecting device 2b is sent to the work robot controller 20 and measurement robot controllers 70.

The target parts 101 are parts of the object 100 on which the work robot 10 performs the predetermined work. In this embodiment, as the predetermined work, a hand 30 of the work robot 10 lifts up a component 110, and the work robot 10 attaches attachment parts 111 of the component 110 to the target parts 101. Accordingly, for example, shafts 111a that extend downward from the attachment parts 111 of the component 110 are fitted into holes 101a provided in the target parts 101 of the object 100.

Note that, in a state in which the object 100 is being moved by the conveyer device 2, the work robot 10 attaches the attachment parts 111 of the component 110 to the target parts 101.

Figure 3:
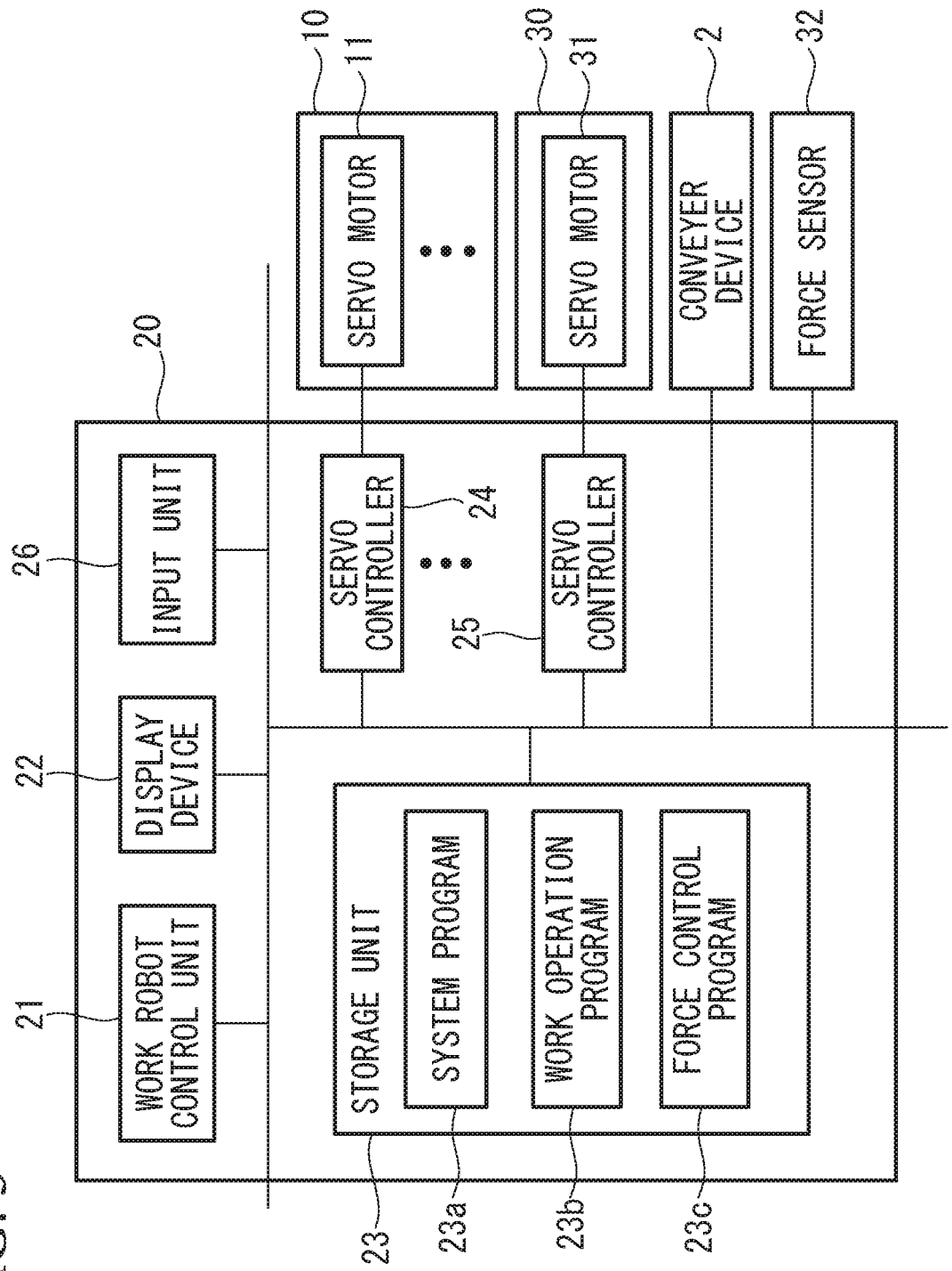
FIG. 3 is a block diagram of a work robot controller in the work robot system of this embodiment.

Although the work robot 10 is not limited to a robot of a particular type, the work robot 10 of this embodiment is provided with a plurality of servo motors 11 that respectively drive a plurality of movable parts (see FIG. 3). Note that the plurality of movable parts constitute an arm 10a of the work robot 10. Each of the servo motors 11 has an operation position detecting device for detecting the operation position thereof, and, the operation position detecting device is, for example, an encoder. Detection values of the operation position detecting devices are sent to the work robot controller 20.

The hand 30 is attached to a distal end of the arm 10a of the work robot 10. Although the hand 30 in this embodiment supports the component 110 through gripping with a plurality of claws, it is also possible to use a hand that supports the component 110 by using a magnetic force, air suction, or a combination thereof.

The hand 30 is provided with a servo motor 31 that drives the claws (see FIG. 3). The servo motor 31 has an operation position detecting device for detecting the operation position thereof, and the operation position detecting device is, for example, an encoder. A detection value of the operation position detecting device is sent to the work robot controller 20.

Note that various servo motors, such as rotary motors or linear motors, can be used as the servo motors 11 and 31.

A force sensor 32 serving as a force detector is attached to the distal end of the arm 10a of the work robot 10. The force sensor 32 detects forces in an x-axis direction, a y-axis direction, and a z-axis direction of a force-sensor coordinate system 202, shown in FIG. 1, for example, and also detects forces about the x-axis, the y-axis, and the z-axis.

In this embodiment, the conveying direction of the conveyer device 2 is consistent with the x-axis direction of a shared coordinate system 201 shown in FIG. 1, the vertical direction is consistent with the z-axis direction in FIG. 1, and the y-axis direction in FIG. 1 is taken to be consistent with the width direction of the conveyer device 2.

The force sensor 32 can be any force sensor that can detect the direction and the degree of a force applied to the hand 30 or to the component 110, which is gripped by the hand 30. Thus, in this embodiment, although the force sensor 32 is provided between the work robot 10 and the hand 30, the force sensor 32 may also be provided inside the hand 30 or may also be provided inside the work robot 10.

As shown in FIG. 3, the work robot controller 20 is provided with: a work robot control unit 21 that has a CPU, a RAM, etc.; a display device 22; a storage unit 23 that has a nonvolatile storage, a ROM, etc.; a plurality of servo controllers 24 that respectively correspond to the servo motors 11 of the work robot 10; a servo controller 25 that handles the servo motor 31 of the hand 30; and an input unit 26 that is connected to the work robot controller 20. Specifically, the work robot controller 20 controls the arm 10a and the hand 30 of the work robot 10. The input unit 26 is, for example, an input device such as an operator's panel that can be carried by an operator. The input unit 26 performs wireless communication with the work robot controller 20 in some cases.

As shown in FIGS. 1 and 2, the work robot system of this embodiment is further provided with: a plurality of measurement robots 60; the measurement robot controllers 70, which are respectively provided for the plurality of measurement robots 60; and sensors 50 that are respectively attached to the plurality of measurement robots 60. In this embodiment, two measurement robots 60 are used. The number of the measurement robots 60 may also be one.

Figure 4:
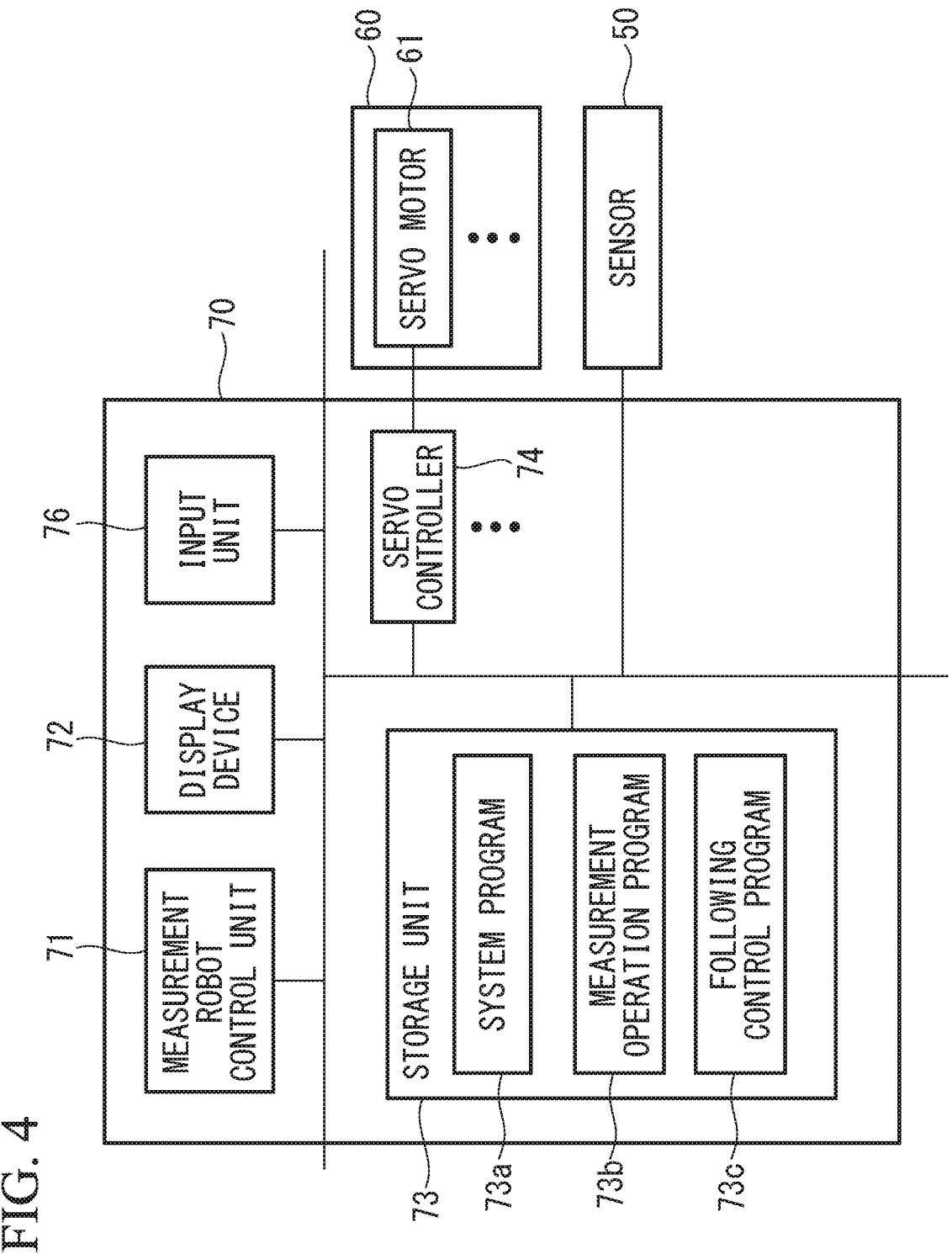
FIG. 4 is a block diagram of a measurement robot controller in the work robot system of this embodiment.

Although each of the respective measurement robots 60 is not limited to a robot of a particular type, each of the measurement robots 60 of this embodiment is provided with a plurality of servo motors 61 that drive a plurality of movable parts (see FIG. 4). Note that the number of the movable parts can be limited depending on the movement of a measurement target. For example, in a case in which the measurement target is moved in a plane without changing the orientation thereof, because the measurement target just needs to be moved in the x-direction and the y-direction, it is sufficient to have two movable parts with two axes, thus making it possible to reduce the manufacturing cost of the measurement robot. Each of the servo motors 61 has an operation position detecting device for detecting the operation position thereof, and the operation position detecting device is, for example, an encoder. A detection value of the operation position detecting device is sent to the corresponding measurement robot controller 70.

Figure 5:
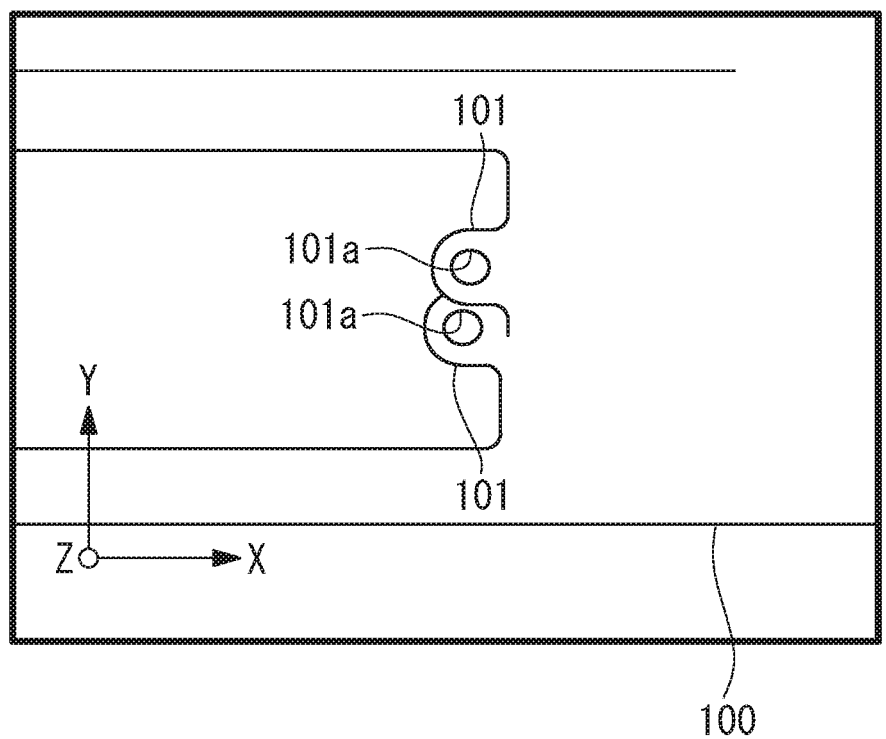
FIG. 5 shows image data acquired by a sensor in the work robot system of this embodiment.

The sensor 50 is attached to a wrist flange 62, for example, at the distal end of each of the measurement robots 60 by using a support member 62a. The sensor 50 is a 2D camera, a 3D camera, a 3D distance sensor, or the like. The sensor 50 in this embodiment is a 2D camera, and the sensor 50 is capable of acquiring image data of the target parts 101, as shown in FIG. 5, for example. The sensor 50 sends the image data to the corresponding measurement robot controller 70. A measurement robot control unit 71, to be described later, applies known image processing, thereby making it possible to identify the position of at least one of the two target parts 101 by using, for example, the image data as shown in FIG. 5. Furthermore, on the basis of the feature shape of at least one of the two target parts 101 in the image data shown in FIG. 5, for example, the measurement robot control unit 71 can identify the orientation of the target part 101.

In this embodiment, the shared coordinate system 201 is used as a coordinate system for the work robot 10 and the two measurement robots 60. Specifically, a position defined in the shared coordinate system 201 indicates a position in real space, which position in real space may be occupied the robots 10 and 60.

In setting the shared coordinate system 201, a setting tool that is provided at the distal end of the work robot 10 and setting tools that are provided at the distal ends of the two measurement robots 60 are respectively brought into contact with a plurality of predetermined places of a calibration jig installed at a certain position on the conveyer device 2. Accordingly, the shared coordinate system 201 is set. In this embodiment, the directions in which the x-axis, the y-axis, and the z-axis of the shared coordinate system 201 extend are matched with the directions in which the x-axis, the y-axis, and the z-axis shown in FIG. 1 extend, and the position of the shared coordinate system 201, i.e., the origin position thereof, corresponds to a predetermined position on the calibration jig.

Furthermore, the two sensors 50 respectively acquire image data of the calibration jig and associate the shared coordinate system 201 with the positions and orientations (sensor coordinate systems 203 and 204) of the sensors 50. In this way, the positions and the directions of the sensors 50 are correlated with the shared coordinate system (calibrated) in advance.

Note that, instead of the calibration jig, another jig may also be used for setting the shared coordinate system.

As shown in FIG. 4, each of the measurement robot controllers 70 is provided with: the measurement robot control unit 71, which has a CPU, a RAM, etc.; a display device 72; a storage unit 73 that has a nonvolatile storage, a ROM, etc.; a plurality of servo controllers 74 that correspond to the servo motors 61 of the corresponding measurement robot 60; and an input unit 76 that is connected to the measurement robot controller 70. The input unit 76 is, for example, an input device such as an operator's panel that can be carried by the operator. The input unit 76 performs wireless communication with the measurement robot controller 70 in some cases.

The storage unit 23 of the work robot controller 20 stores a system program 23a, and the system program 23a is in charge of the basic function of the work robot controller 20. Furthermore, the storage unit 23 stores a work operation program 23b. Furthermore, the storage unit 23 stores a force control program 23c.

The storage unit 73 of each of the measurement robot controllers 70 stores a system program 73a, and the system program 73a is in charge of the basic function of the measurement robot controller 70. Furthermore, the storage unit 73 stores a measurement operation program 73b. Furthermore, the storage unit 73 stores a following control program 73c.

The measurement robot control unit 71 sends, to the respective servo controllers 74, control commands to monitor the positions or the movement amounts of the target parts 101, on the basis of the programs 73a, 73b, and 73c. Furthermore, the work robot control unit 21 sends, to the servo controllers 24 and 25, control commands to perform the predetermined work on the object 100, on the basis of the programs 23a, 23b, and 23c. Accordingly, the work robot 10 and the hand 30 perform the predetermined work on the object 100.

Figure 6:
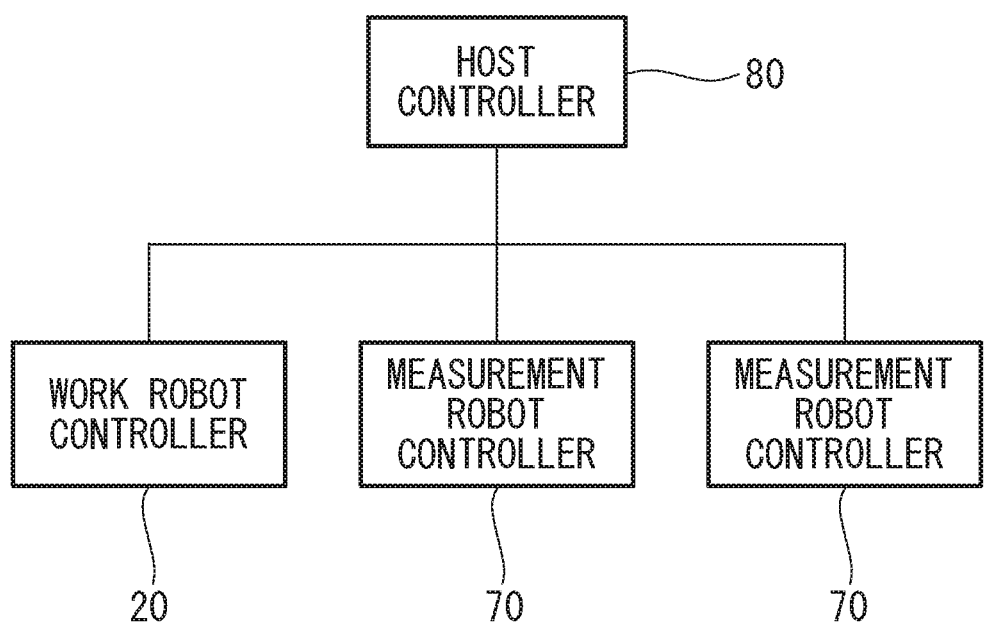
FIG. 6 is a view showing an example configuration of a control system in this embodiment.

Note that, as shown in FIG. 6, the work robot controller 20 and the respective measurement robot controllers 70 may be connected to the host controller 80. The host controller 80 is a computer that has: a processor; a storage unit, such as a RAM and a hard disk; an input unit; and a transceiving unit. The operating state of the work robot 10 and the operating states of the respective measurement robots 60 are sent to the host controller 80. Data of the positions and the movement amounts of the target parts 101, which are monitored by the sensors 50 and the measurement robot controllers 70, and data related thereto, to be described later, are sequentially sent to the host controller 80. Furthermore, the data is sequentially sent from the host controller 80 to the work robot controller 20. Furthermore, other data received by the host controller 80 is sent from the host controller 80 to the work robot controller 20 and the respective measurement robot controllers 70.

Note that, in a case in which the host controller is not provided, data exchange is directly performed between the respective controllers.

Figure 7:
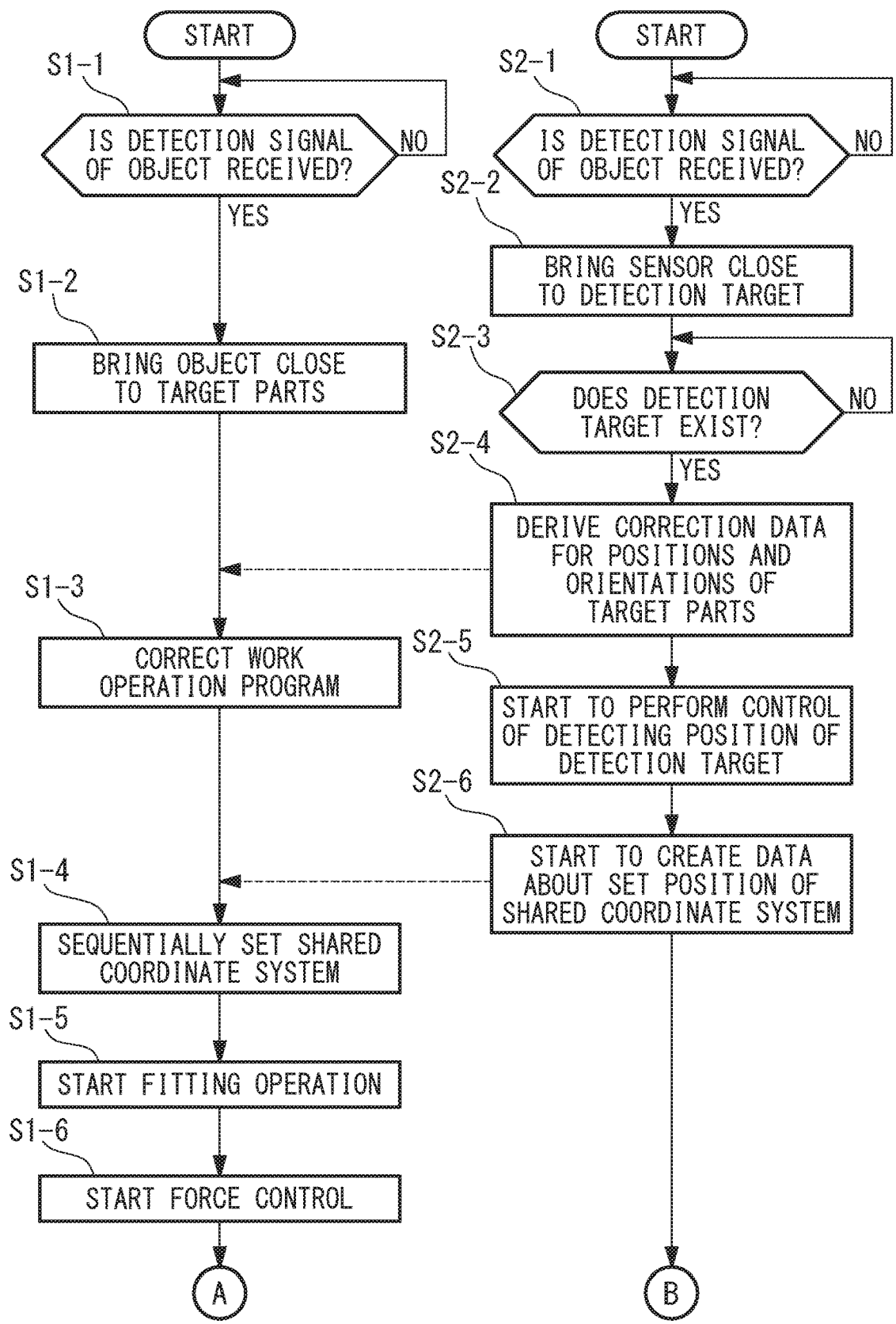
FIG. 7 is a flowchart showing example of processing performed by the work robot controller and the measurement robot controller in this embodiment.
Figure 8:
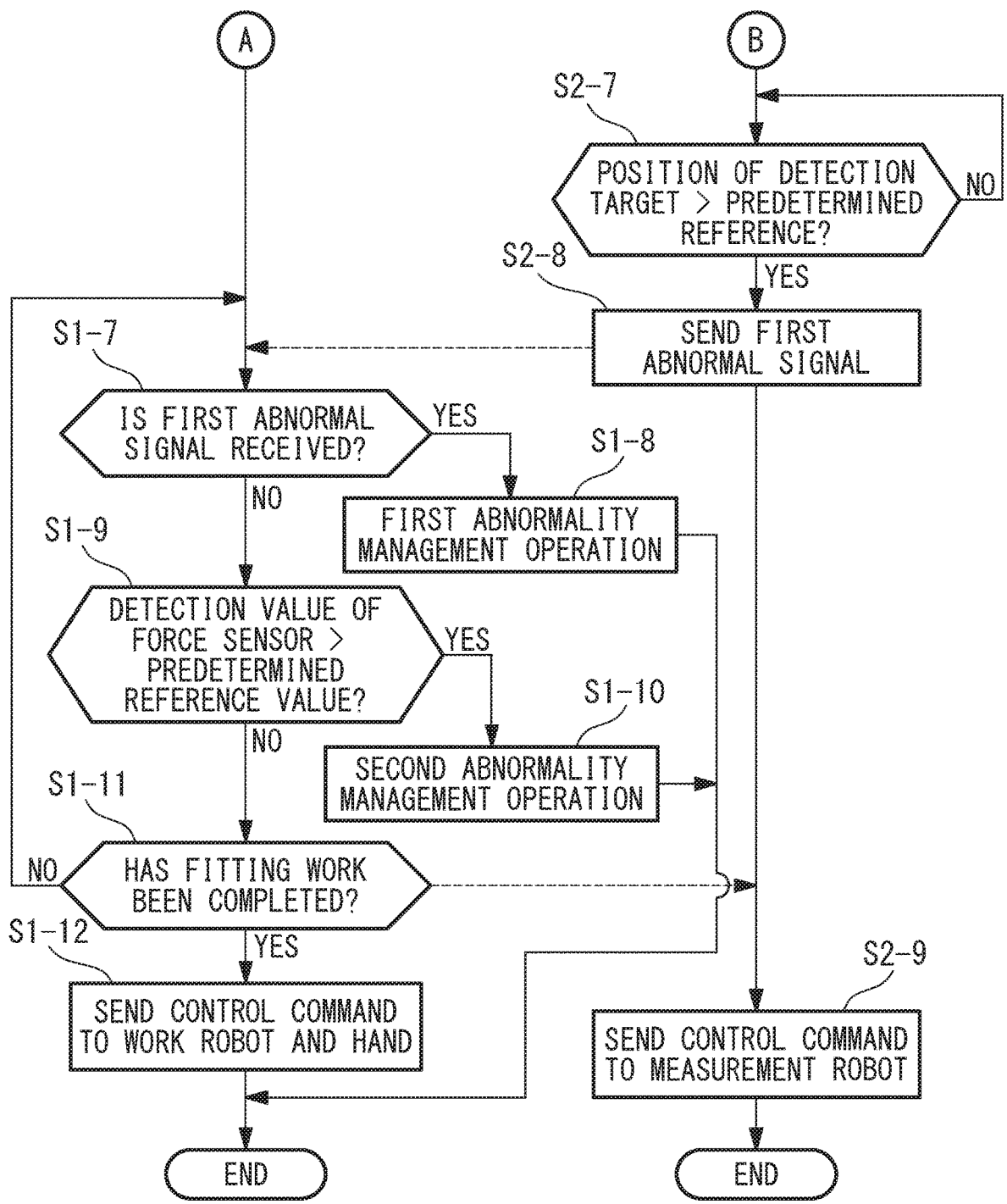
FIG. 8 is a flowchart showing the example of processing performed by the work robot controller and the measurement robot controller in this embodiment.

Processing performed by the work robot control unit 21 and each of the measurement robot control units 71 when the work robot 10 performs the predetermined work on the object 100 will be described with reference to a flowchart shown in FIGS. 7 and 8. Note that the following control is performed in a state in which the object 100 is being conveyed by the conveyer device 2.

Figure 9:
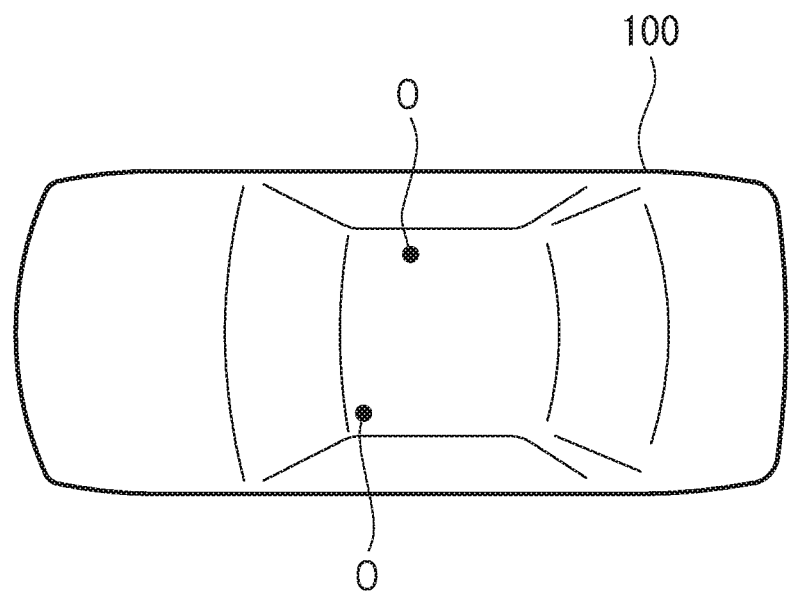
FIG. 9 is a plan view of an object that serves as a work target in this embodiment.

Furthermore, here, detection targets O are respectively prepared for the two sensors 50, and the detection targets O are, for example, marks provided on the top surface of the object 100 (FIG. 9). Note that the detection targets O can each be anything as long as the position and orientation thereof with respect to the target parts 101 do not change.

First, when a detection signal of the object 100 obtained by the detection device 40 is received (Step S1-1), the work robot control unit 21 sends, to the respective servo controllers 24, control commands to bring the component 110, which is gripped by the hand 30, close to the target parts 101, on the basis of the work operation program 23b (Step S1-2).

Furthermore, when the detection signal of the object 100 obtained by the detection device 40 is received (Step S2-1), each of the measurement robot control units 71 sends, to the respective servo controllers 74, control commands to bring the corresponding sensor 50 on the corresponding measurement robot 60 close to the corresponding detection target O of the object 100, on the basis of the measurement operation program 73b (Step S2-2). As noted, the sensor(s) 50 is(are) attached to the wrist flange(s) 62 of the measurement robot(s) 60 via the support member(s) 62a.

In order to perform the control in Steps S1-2 and S2-2, the work robot control unit 21 and the measurement robot control unit 71 use data about the positions of the robots with respect to the target parts 101 and the detection target O on the object 100. Note that, here, the positions of the robots may be corrected by using an approximate conveying speed of the conveyer device 2 that is specified in advance, or the positions of the robots may be corrected by using a conveying speed of the conveyer device 2 that is obtained by the operation position detecting device 2b.

Next, when the detection target O moves into the angle of view of the sensor 50 (Step S2-3), the measurement robot control unit 71 derives correction data for the position coordinates and the orientations of the target parts 101 as a first processing. The correction data from this first processing is derived by the measurement operation program 73b based on measurement of the detection target O (Step S2-4). The work robot control unit 21 corrects the work operation program 23b using the derived correction data (Step S1-3). At the same time as or right after the first processing, a second processing is performed. During the second processing, the measurement robot control unit 71 starts to detect the position and the movement speed of the detection target O (Step S2-5) and also starts to create data about set positions of the shared coordinate system 201 (Step S2-6). Furthermore, the work robot control unit 21 starts to sequentially set the shared coordinate system 201 using the data (Step S1-4). Steps S2-4, S2-6, etc. may be performed by the work robot controller 20, the host controller 80, or another computer.

First Processing

The measurement robot control unit 71 detects the position of or the position and orientation of the detection target O in the shared coordinate system 201 by using image data of the sensor 50. Then, the measurement robot control unit 71 obtains correction data for the first processing from the spatial relationship between a predetermined reference position and an actual detection result. Because the position and orientation of each of the detection targets O do not change with respect to the target parts 101, the correction data can be used as correction data for the target parts 101.

Figure 10:
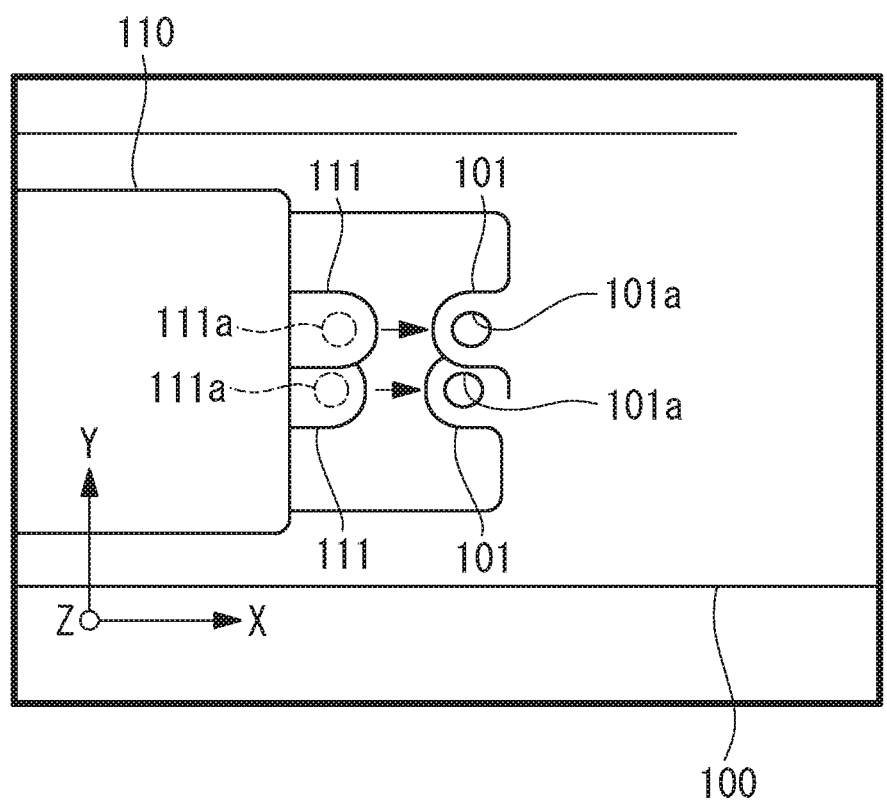
FIG. 10 is a plan view of target parts of the object and attachment parts of a component in this embodiment.

The work robot control unit 21 corrects the work operation program 23b by using the correction data derived by the measurement robot control unit 71. Note that it is possible to correct one or both of the position and/or the orientation of the hand 30. Accordingly, when the shafts 111a of the component 110, which is supported by the hand 30, are fitted into the holes 101a of the target parts 101 through control, to be described later (FIG. 10), the accuracy of fitting can be improved.

Second Processing

In order to perform Steps S2-5 and S2-6 as the second processing, for example, the following two types of control can be used. In this embodiment, the former control is referred to as an image-based method, and the latter control is referred to as a position-based method. It is of course possible to perform Steps S2-5 and S2-6 by using other types of control. In this embodiment, in the two types of control, although the position of the detection target O is detected from detection data of the corresponding sensor 50, it is also possible to detect the position and orientation of the detection target O from detection data of the corresponding sensor 50.

In the control using the image-based method, under control of each of the measurement robots 60, a feature shape and/or a feature point on the object 100 is always disposed at a predetermined position in the angle of view of the sensor 50. This permits the sensor 50 to follow the detection target O. Moreover, while following the detection target O, it becomes possible to link a change in the position of the sensor 50 with a change in the set position in the shared coordinate system 201.

In this embodiment, under control of the measurement robot 60 based on the following control program 73c, the detection target O is maintained at the predetermined position, e.g., at the center of view of the sensor 50. Since the position of the detection target O is determinable based on its relationship with the sensor 50, movements of the distal end of the measurement robot 60 or, alternatively, movements of the position of the sensor 50, may be linked with changes of the set position in the shared coordinate system 201.

For example, in a case in which the position of one of the two sensors 50 is changed, at a certain moment, by 1 mm in the X-direction, the origin position of the shared coordinate system 201 is set so as to be changed by 1 mm, or the average of changes of the positions of the two sensors 50 is set as a displacement of the origin position of the shared coordinate system 201.

Through this control, the set position of the shared coordinate system 201 is moved in accordance with movement of the sensors 50, thus bringing about a state in which the shared coordinate system 201 follows the target parts 101.

Note that, when the two detection targets O are moved in the x-axis direction and the y-axis direction, the set position of the shared coordinate system 201 is also moved in the x-axis direction and the y-axis direction. Specifically, the target parts 101 are in an obliquely moving state. Note that, when the positions of the two detection targets O are rotated about an axis parallel to the z-axis or the like, the orientation of the shared coordinate system 201 may also be rotated.

On the other hand, in the control using the position-based method, while moving the sensor 50 in accordance with conveyance of the object 100, the measurement robot control unit 71 sequentially detects the position of the feature shape and/or the feature point on the object 100, on the fixed shared coordinate system 201, by using image data sequentially acquired by the sensor 50. In this embodiment, the positions of the target parts 101 of the object 100 are sequentially detected on the basis of the detection result of the position of the detection target O, whose position and orientation do not change with respect to the target parts 101. Note that, at the same time, the orientations of the target parts 101 may also be sequentially detected. Then, the measurement robot control unit 71 sequentially creates data about the set position of the shared coordinate system, for sequentially moving the shared coordinate system 201, on the basis of the differences between detected positions on the shared coordinate system 201 while the detected position moves as time passes (for example, the difference between the current detected position and a detected position at a certain point in time in the past).

Note that, when the two detection targets O are moved in the x-axis direction and the y-axis direction, the set position of the shared coordinate system 201 is also corrected in the x-axis direction and the y-axis direction. Note that, when the positions of the two detection targets O are rotated about an axis extending in the z-axis direction or the like, the orientation of the shared coordinate system 201 may also be rotated.

Here, in the first processing, in order to detect the positions of the detection targets O, which enter the detection regions of the sensors 50, all of the detection regions need to be subjected to image processing; however, in the second processing, because approximate positions of the detection targets O can be identified, the detection regions are partially subjected to image processing, thus making it possible to achieve improvement of the processing speed.

Figure 11:
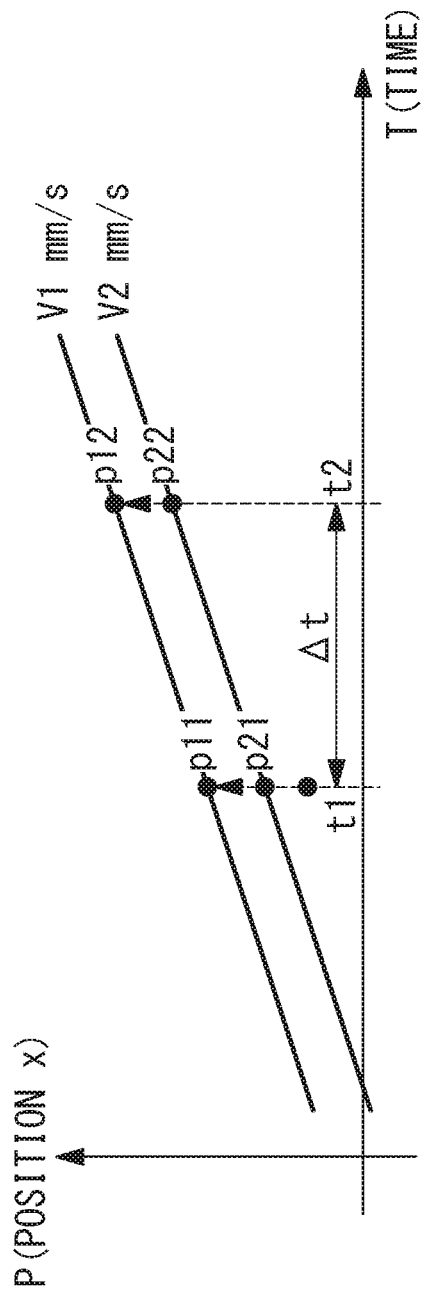
FIG. 11 is a view for explaining a coordinate system for following control in the work robot system of this embodiment.

In the above-described two types of control, as shown in FIG. 11, for example, when positions p11 and p21 of the two detection targets O are moved to positions p12 and p22, respectively, the measurement robot control units 71 perform fitting by a least squares method or the like, thus respectively calculating the movement speeds of the two detection targets O. Alternatively, an average movement speed is calculated by averaging the movement speeds of the two detection targets O. The calculated movement speed is multiplied by time, thus obtaining a movement amount.

This movement amount may be used to interpolate the set positions for moving the shared coordinate system 201.

Furthermore, in the control using the position-based method, the center position of the two detection targets O in the shared coordinate system 201 can also be used as the detected position of the two detection targets O. In a case where there are three or more detection targets O, the position of the center of gravity of the three or more detection targets O can be used as the detected position of these detection targets O. By using the center position of a plurality of detection targets O or the position of the center of gravity thereof, it is possible to reduce the influence of a detection error of the object 100.

Then, the work robot control unit 21 starts to send, to the respective servo controllers 24, control commands to fit the shafts 111a of the component 110 into the holes 101a of the target parts 101 on the basis of the work operation program 23b (Step S1-5).

Here, the work operation program 23b in this embodiment sequentially changes the positions and orientations of the shafts 111a of the component 110 in the shared coordinate system 201.

In the control in which the set position of the shared coordinate system 201 is sequentially adjusted in accordance with the detection results of the sensors 50 in Step S1-4, although the conveyer device 2 moves the target parts 101 of the object 100, the target parts 101 look stationary in the shared coordinate system 201.

In the thus-controlled state, the work robot control unit 21 starts to perform force control based on the force control program 23c (Step S1-6). As the force control, known force control can be used. In this embodiment, the work robot 10 moves the component 110 in a direction away from a force detected by the force sensor 32. A movement amount thereof is determined by the work robot control unit 21 in accordance with a detection value of the force sensor 32.

For example, in a situation in which the shafts 111a of the component 110, which is gripped by the hand 30, start to be fitted into the holes 101a of the object 100, when a force in the opposite direction to the conveying direction of the conveyer device 2 is detected by the force sensor 32, the work robot 10, while following, slightly moves the component 110 in the opposite direction to the conveying direction, away from the detected force.

Then, when the position of the detection target O with respect to the sensor 50 changes beyond a predetermined reference (Step S2-7), the measurement robot control unit 71 sends a first abnormal signal to the work robot controller 20 (Step S2-8). When the first abnormal signal is received (Step S1-7), the work robot control unit 21 performs a first abnormality management operation (Step S1-8). A change beyond the predetermined reference corresponds to a large movement of the detection target O in image data, a movement of the detection target O faster than a predetermined speed in image data, disappearance of the detection target O at an unintended timing, or the like. In a case of unstable power supply, the rotation speed of the motor 2a suddenly drops in some cases, or the rotation speed of the motor 2a significantly changes in some cases. In such cases, the position of the detection target O with respect to the sensor 50 changes beyond the predetermined reference.

Note that Steps S2-7 and S2-8 may be performed prior to the fitting operation (Step S1-5).

As the first abnormality management operation, the work robot control unit 21 performs an operation for reducing the control cycle of force control or an operation for increasing the sensitivity of force control, an operation for stopping the progress of fitting, or an operation for cancelling the fitting work. When the control cycle of force control is reduced, or the sensitivity of force control is increased, it is possible to move the work robot 10 so as to be more sensitive to a force applied to the component 110. In this embodiment, the work robot control unit 21 performs an operation for cancelling the fitting work, an operation for retraction, an operation for stopping the conveyer device, or an operation that is a combination of such operations.

Furthermore, when a detection value of the force sensor 32 exceeds a predetermined reference value (Step S1-9), the work robot control unit 21 performs a second abnormality management operation (Step S1-10). When the detection value of the force sensor 32 exceeds the predetermined reference value, the probability of an abnormal force being applied to the component 110, the object 100, or the like is high. Thus, the work robot control unit 21 performs, as the second abnormality management operation, an operation for retracting or stopping the work robot 10, an operation for slowly moving the work robot 10 in a direction away from the direction of the force detected by the force sensor 32, an operation for stopping the conveyer device 2, an operation for releasing the hand 30 from the component 110, or an operation of a combination of such operations. In this embodiment, the work robot control unit 21 performs an operation for stopping the work robot 10 and the conveyer device 2.

On the other hand, the work robot control unit 21 determines whether the fitting work has been completed (Step S1-11). If the fitting work has been completed, the work robot control unit 21 sends control commands to the work robot 10 and the hand 30 (Step S1-12). Accordingly, the hand 30 is released from the component 110, and the hand 30 is moved, by the work robot 10, to a stand-by position or to a place where a next component 110 is stocked. At the same time, the measurement robot control unit 71 sends, to the measurement robot 60, control commands to move the sensor 50 to a stand-by position (Step S2-9).

The movement speeds of the detection targets O, which are obtained in Step S2-5, can be used even if the sensors 50 become unable to detect the positions of the detection targets O. For example, the measurement robot control units 71 can create data about the set position of the shared coordinate system by using the positions of the two detection targets O that are detected immediately before and movement speeds that are calculated before the detection targets O disappear.

Note that a machining tool may be supported at the distal end of the work robot 10, and the work robot 10 may perform machining, as the predetermined work, on the object 100 conveyed by the conveyer device 2. In this case, the machining tool is a drill, a milling cutter, a drill tap, a deburring tool, or another tool. In this case, the machining tool is brought close to the target parts 101 in Step S1-2, and force control is performed in accordance with a contact between the machining tool and the target parts 101 in Step S1-6, thereby making it possible to achieve the same effect as described above.

Note that, when the position-based method is used in the second processing, the correction data of the first processing can also be obtained by sequentially detecting the positions of the detection targets O. In this case, Step S2-4 in the first processing is unnecessary.

In this way, in this embodiment, the measurement robots 60 move the sensors 50 in accordance with conveyance of the object 100, and, at this time, the positions of the target parts 101 of the object 100 are sequentially detected. Then, the work robot 10 is controlled by using the positions of the target parts 101, which are sequentially detected in this way. Thus, even in a state in which force control is not performed, the work robot control unit 20 can recognize a positional relationship between the component 110 or a tool that is supported by the work robot 10 and the object 100 and can recognize the presence or absence of contact therebetween in some cases. For example, the work robot control unit 21 can also recognize, in a state in which force control is not performed, an abnormality of the conveyer device 2 that causes the movement amount of the object 100, which is moved by the conveyer device 2, to be significantly changed. Thus, without forcibly reducing the control cycle of force control, it is possible to realize prevention of damage to the work robot 10, the conveyer device 2, the object 100, etc., and to suppress unexpected oscillation of the work robot 10.

Here, in a case in which the sensor 50 is supported, together with the component 110 or a tool, at the distal end of the work robot 10, the angle of view (detection region) of the sensor 50 is blocked by the component 110 or the tool in some cases. When the component 110 or the tool is brought into contact with the object 100, the sensor 50 becomes unable to detect the target parts 101 or a neighborhood thereof in some cases. In this embodiment, the sensors 50 are supported by the measurement robots 60, which are different from the work robot 10. Thus, the probability of the detection regions of the sensors 50 being blocked by the component 110 or the tool is reduced, and the detection state of the target parts 101 or a neighborhood thereof detected by the sensors when the component 110 or the tool is brought into contact with the object 100 is improved.

Furthermore, in a case in which the sensor 50 is supported, together with the component 110 or a tool, at the distal end of the work robot 10, it is necessary to detach the sensor 50 from the work robot 10 when the tool or the work robot 10 is washed or repaired. In this case, when the sensor 50 is reattached to the work robot 10, calibration of the sensor 50 needs to be performed. In this embodiment, because the sensor 50 is supported by the measurement robot 60, which is different from the work robot 10, it is possible to reduce or save time and effort required for calibration of the sensor 50.

Furthermore, in a case in which the sensor 50, which is a camera, is supported at the distal end of the work robot 10, it is necessary to adjust the focus of the sensor 50 when the distance between the distal end of the work robot 10 and the object 100 changes in accordance with the progress of work. It is not easy to sequentially adjust the focus of the sensor 50 in accordance with the progress of work, and a delay in focusing affects the accuracy of control of the work robot 10. In this embodiment, because the sensors 50 are supported by the measurement robots 60, which are different from the work robot 10, it is not necessary to sequentially adjust the focuses of the sensors 50 in accordance with the progress of work of the work robot 10.

Furthermore, in this embodiment, by using the detection results of the sensors 50, the work robot control unit 21 causes the component 110 or the tool, which is supported by the work robot 10, to follow the target parts 101. Thus, when the work robot 10 performs the predetermined work, the work robot control unit 21 can accurately control the position and orientation of the component 110 or the tool, which is supported by the work robot 10, with respect to the target parts 101 of the object 100 conveyed by the conveyer device 2. This is advantageous for realizing prevention of damage to the work robot 10, the conveyer device 2, the object 100, etc. without reducing the control cycle of force control or increasing the sensitivity of force control, and is also advantageous for suppressing unexpected oscillation of the work robot 10.

Furthermore, with the image-based method in this embodiment, the measurement robot control units 71 cause the measurement robots 60 to make the sensors 50 follow the detection targets O, thereby detecting the positions of the target parts 101. Note that the measurement robot control units 71 may cause the measurement robots 60 to make the sensors 50 follow the target parts 101.

With this configuration, changes in the positions of the distal ends of the measurement robots 60 or the sensors 50, which follow the detection targets O or the target parts 101, corresponds to changes in the positions of the target parts 101 moved by the conveyer device 2. Because the measurement robot control units 71 recognize the positions of the distal ends of the measurement robots 60 or the sensors 50, this configuration is advantageous for easily and reliably obtaining changes in the positions of the target parts 101.

Furthermore, with the position-based method in this embodiment, the measurement robot control units 71 sequentially detect the positions of the target parts 101 by using the positions of the sensors 50, which are appropriately moved in accordance with conveyance of the object 100, and the positions of the detection targets O with respect to the sensors 50. Note that it is also possible to use the positions of the target parts 101 with respect to the sensors 50.

With this configuration, the measurement robot control units 71 recognize the positions of the sensors 50, which are appropriately moved in accordance with conveyance of the object 100. Thus, for example, the positions and orientations of the detection targets O or the target parts 101 with respect to the sensors 50 can be sequentially obtained. This is advantageous for easily and reliably obtaining the positions and orientations of the target parts.

Note that the measurement robots 60 may measure the object 100, in a stopped state for a certain period of time, or may detect the positions of the target parts 101 or the detection targets O on the object 100, at a predetermined position while intermittently moving in accordance with conveyance of the object 100.

Furthermore, in this embodiment, the positions of the target parts 101 are sequentially detected by causing the sensors 50 to follow the detection targets O, whose positions do not change with respect to the target parts 101, or by detecting the detection targets O by means of the sensors 50. Thus, even in a case in which the target parts 101 are covered with the component 110 or the tool, the positions of the target parts 101 can be sequentially detected, and this is extremely advantageous for improving the accuracy of work performed by the work robot 10.

Furthermore, the detection device 40, which detects at least the position of the object 100 on the conveyer device 2, is provided, the work robot control unit 21 brings the component 110 or the tool, which is supported by the work robot 10, close to the target parts 101 on the basis of the detection result of the detection device 40, and the measurement robot control units 71 bring the sensors 50 of the measurement robots 60 close to the target parts 101 or the detection targets O on the basis of the detection result of the detection device 40. Note that, at the time of making such approaches, the work robot may change the orientation of the component or the tool in accordance with the orientations of the target parts, or the measurement robots may change the orientations of the sensors in accordance with the orientations of the target parts or the detection targets.

When the work robot 10 and the measurement robots 60 operate in this way on the basis of the detection result of the detection device 40, the work efficiency is improved. At this time, the work robot control unit 21 and the measurement robot control units 71 may also use the detection result of the operation position detecting device 2b to bring the component 110, which is supported by the work robot 10, close to the target parts 101 and to bring the sensors 50 of the measurement robots 60 close to the target parts 101 or the detection targets O, respectively. By using the detection result of the operation position detecting device 2b, the above-described control becomes more accurate.

Furthermore, in this embodiment, when the positions of the target parts 101 or the detection targets O, which are viewed from the sensors 50, change beyond the predetermined reference, the work robot control unit 21 performs an abnormality management operation.

With this configuration, in a state in which the positional relationship between the component 110 or the tool, which is supported by the work robot 10, and the object 100 is recognized, the work robot control unit 21 further performs the abnormality management operation on the basis of the detection result of each of the sensors 50. This configuration is advantageous for achieving reliable realization of prevention of damage to the work robot 10, the conveyer device 2, the object 100, etc., and is also advantageous for suppressing unexpected oscillation of the work robot 10.

In this embodiment, although the detection device 40 is a photoelectric sensor, the detection device 40 may also be a 2D camera, a 3D camera, a 3D distance sensor, or a sensor that radiates line light onto a target object, thus measuring the shape thereof, the 2D camera, 3D camera, 3D distance sensor, or sensor being disposed above, beside, or below the conveyer device 2. In a case in which the detection device 40 is a 2D camera, the work robot control unit 21 and the measurement robot control units 71 may be able to recognize the positions of the target parts 101 of the object 100, which is conveyed by the conveyer device 2, and recognize the orientations thereof on the basis of image data that is a detection result of the detection device 40. Thus, in Step S1-2, the work robot control unit 21 can more accurately bring the shafts 111a of the component 110 close to the holes 101a of the target parts 101.

Note that, in Step S2-5, the measurement robot control units 71 can cause the distal ends of the measurement robots 60 and the sensors 50 to follow the detection targets O, by using the positions of the detection targets O in the image data, the movement speeds of the detection targets O in the image data, the directions thereof, etc. It is also possible to cause the distal ends of the measurement robots 60 and the sensors 50 to follow the detection targets O by using another known method.

Furthermore, as the conveyer device 2, it is also possible to use a conveyer device that conveys the object 100 along a curved route or to use a conveyer device that conveys the object 100 along a winding route. In such a case, the work robot control unit 21 can cause the component 110, which is supported by the work robot 10, to follow the target parts 101 by using the detection result of each of the sensors 50. Furthermore, when the position of the detection target O with respect to the sensor 50 changes beyond the predetermined reference in Step S2-7, the work robot control unit 21 can perform the first abnormality management operation in Step S1-8. Specifically, even when the above-mentioned conveyer device is used, the same effect as described above can be achieved.

Note that Steps S2-7 and S2-8 may also be performed prior to the fitting operation (Step S1-5).

Note that the position obtained in Step S2-5 is calculated on the basis of image data actually acquired by the corresponding sensor 50. Thus, the position obtainment cycle is affected by the image acquisition cycle of the sensor 50. In contrast to this, it is also possible to interpolate the position sequentially obtained on the basis of the image data of the sensor 50. For example, the measurement robot control unit 71 identifies a trend of change of the position and the movement amount by using detection results at a plurality of successive positions. Then, the measurement robot control unit 71 can set, along the identified trend, an interpolation position between a detection position and a detection position.

In Step S1-8, as the first abnormality management operation, the work robot control unit 21 may stop the motor 2a of the conveyer device 2 or may reduce the speed of the motor 2a of the conveyer device 2.

In this embodiment, the force sensor 32 is attached to the distal end of the work robot 10. On the other hand, it is also possible to dispose the force sensor 32 inside the hand 30, inside the robot 10, between the conveyer device 2 and the object 100, or inside the object 100. In this case, it is also possible to perform the force control, which is based on a detection value of the force sensor 32, and to achieve the same effect as described above.

Furthermore, the sensors 50 may also be attached to portions, other than the wrist flange 62, of the measurement robot 60.

Figure 12:
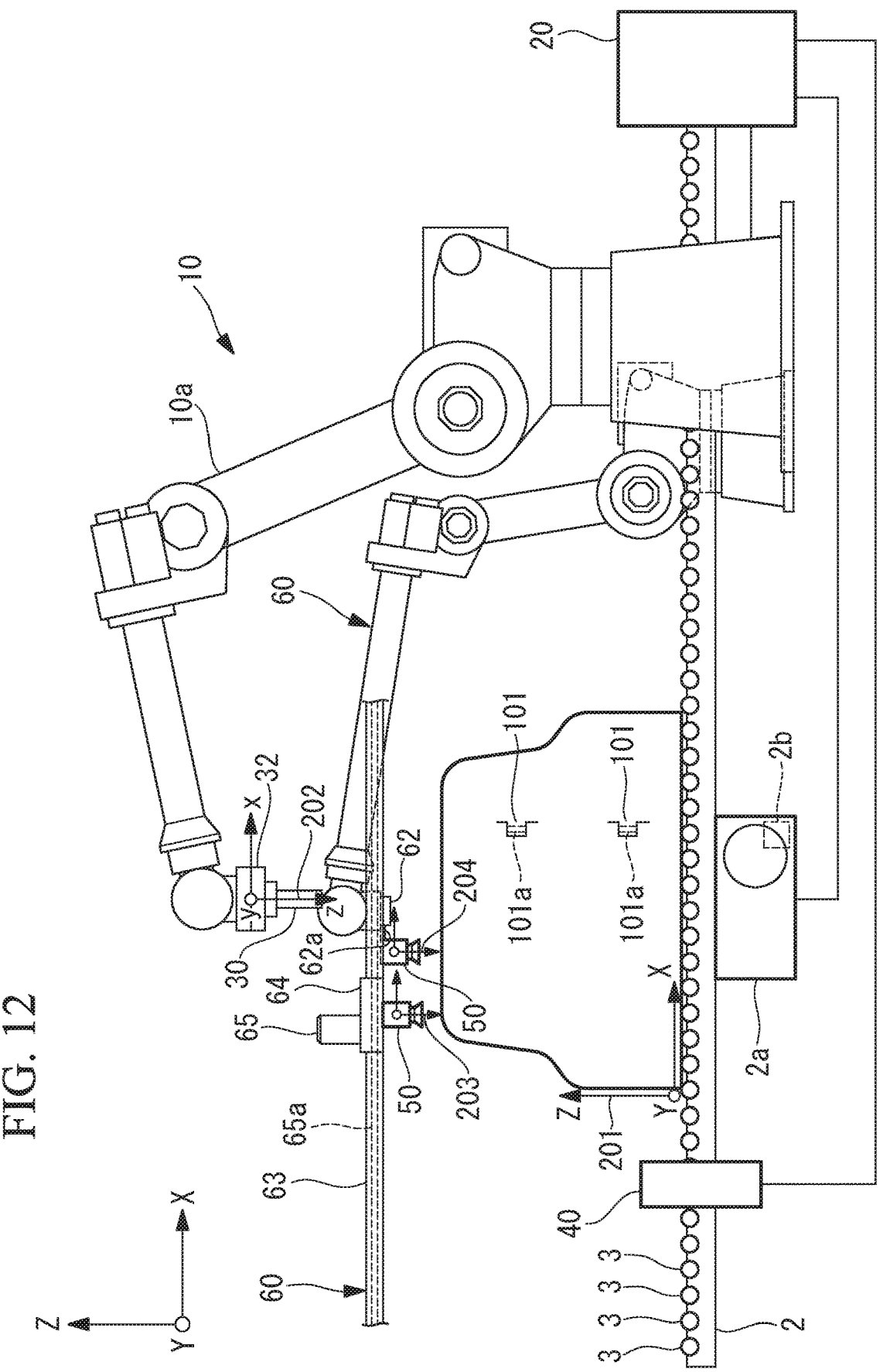
FIG. 12 is a view showing the configuration of a modification of the work robot system of this embodiment.

Furthermore, the measurement robot 60 may be a robot that moves the sensors 50 in only one direction. For example, as shown in FIG. 12, the measurement robot 60 has: a rail 63 that extends in the x-axis direction; a slider 64 that is supported by the rail 63; and a servo motor 65 and a ball screw 65a that move the slider 64 along the rail 63. In this case, the measurement robot 60 can appropriately move the sensors 50 in accordance with movement of the object 100.

For example, if the positions of the target parts 101 and the detection targets O do not change in the y-axis direction, the measurement robot control unit 71 can control the servo motor 65 to perform the aforementioned control using the image-based method and the aforementioned control using the position-based method. Even in a case in which the positions of the target parts 101 and the detection targets O change in the y-axis direction, the aforementioned control using the position-based method can be performed. Thus, the same operation effect as described above can be achieved.

A mechanism for moving the sensors 50 in the y-axis direction can also be provided on the slider 64. In this case, even if the positions of the target parts 101 and the detection targets O change in the y-axis direction, the aforementioned control using the image-based method can be performed.

Note that, in this embodiment, the sensors 50 of the measurement robots 60 detect the detection targets O, which are provided on the upper surface of the object 100. In contrast to this, it is also possible to further provide a measurement robot 60 that detects a detection target O provided on a rear surface of the object 100 and a measurement robot 60 that detects a detection target O provided on a lateral surface of the object 100. In this case, 3D positions and orientations of the target parts 101 can be detected.

Note that, in a case in which the target parts 101 are detected by both or one of the sensors 50, instead of detecting the detection targets O by means of the two sensors 50, the measurement robot control unit 71 uses known image processing, thereby making it possible to identify the position of at least one of the two target parts 101 by using, for example, the image data shown in FIG. 5. Furthermore, the measurement robot control unit 71 can identify the orientations of the target parts 101 on the basis of the feature shapes of or a plurality of feature points of the target parts 101 in the image data shown in FIG. 5.

Furthermore, in Step S1-4, which is part of the second processing, it is also possible to correct the work operation program 23b instead of moving the shared coordinate system 201. In this case, in Step S2-6, each of the measurement robot control units 71 sequentially creates data to be used to correct the work operation program 23b on the basis of the difference between the reference position of the detection target O and an actual detected position thereof, and the work robot control unit 21 uses the created data to sequentially correct a teaching point of the work operation program 23b that is taught in advance with respect to the shared coordinate system 201. In this case, the same operation effect as described above is also afforded.

From the above-described embodiments, the following aspects of the present disclosure are derived.

According to a first aspect, the present invention provides a work robot system including: a conveyer device that conveys an object; a work robot that performs predetermined work on a target part of the object conveyed by the conveyer device; a work robot control unit that controls the work robot; a sensor that is used for detecting a position of the target part or a detection target, whose position does not change with respect to the target part, on the object conveyed by the conveyer device; a measurement robot that can move the sensor in order to detect the position; a measurement robot control unit that controls the measurement robot; and a force detector that detects a force generated by a contact between a component or a tool that is supported by the work robot and the object, wherein, when the predetermined work is performed by the work robot, the work robot control unit performs force control based on a detection value of the force detector, while performing control of the work robot based on the detected position of the target part or the detection target.

In the above-described aspect, the sensor is moved by the measurement robot, and, at this time, the position of the target part or the detection target on the object is detected. Note that, the measurement robot may operate on the basis of a measurement result obtained by itself or may move to a predetermined position. Furthermore, the measurement robot may measure the object in a stopped state for a certain period of time or may detect the position of the target part or the detection target of the object, at a predetermined position while intermittently moving in accordance with conveyance of the object. Then, the work robot is controlled by using the position of the target part or the detection target detected in this way. Thus, even in a case in which force control is not performed, the work robot control unit can recognize a positional relationship between the component or the tool, which is supported by the work robot, and the object and can recognize the presence or absence of contact therebetween in some cases. For example, in a case in which force control is not performed, the work robot control unit can also recognize an abnormality of the conveyer device that causes the movement amount of the object, which is moved by the conveyer device, to be significantly changed. Thus, without forcibly reducing the control cycle of force control, it is possible to realize prevention of damage to the work robot, the conveyer device, the object, etc., and to suppress unexpected oscillation of the work robot.

Here, in a case in which the sensor is supported, together with the component or the tool, at the distal end of the work robot, the detection region of the sensor is blocked by the component or the tool in some cases. When the component or the tool is brought into contact with the object, the sensor becomes unable to detect the target part or a neighborhood thereof in some cases. In this aspect, the sensor is supported by the measurement robot, which is different from the work robot. Thus, the probability of the detection region of the sensor being blocked by the component or the tool is reduced, and the detection state of the target part or a neighborhood thereof detected by the sensor when the component or the tool is brought into contact with the object is improved.

Furthermore, in a case in which the sensor is supported, together with the component or the tool, at the distal end of the work robot, it is necessary to detach the sensor from the work robot when the tool or the work robot is washed or repaired. In this case, when the sensor is reattached to the work robot, it is necessary to perform calibration of the sensor. In the above-described aspect, because the sensor is supported by the measurement robot, which is different from the work robot, it is possible to reduce or save time and effort required for calibration of the sensor.

Furthermore, in a case in which the sensor is a camera, and the sensor is supported at the distal end of the work robot, when the distance between the distal end of the work robot and the object changes in accordance with the progress of work, it is necessary to adjust the focus of the sensor. It is not easy to sequentially adjust the focus of the sensor in accordance with the progress of work, and a delay in focusing affects the accuracy of control of the work robot. In the above-described aspect, because the sensor is supported by the measurement robot, which is different from the work robot, it is possible to maintain the distance between the target part or the detection target and the camera, irrespective of the progress of work. Thus, it is not necessary to sequentially adjust the focus of the sensor in accordance with the progress of work of the work robot.

In the above-described aspect, it is preferred that the work robot control unit perform the force control by using the detection value of the force detector, while causing the component or the tool, which is supported by the work robot, to follow the target part on the basis of the detected position of the target part or the detection target.

In this way, by using the detection result of the sensor, the work robot control unit causes the component or the tool, which is supported by the work robot, to follow the target part. Thus, when the work robot performs predetermined work, the work robot control unit can accurately control the position and orientation of the component or the tool, which is supported by the work robot, with respect to the target part of the object conveyed by the conveyer device. This is advantageous for realizing prevention of damage to the work robot, the conveyer device, the object, etc., without reducing the control cycle of force control or increasing the sensitivity of force control, and is advantageous for suppressing unexpected oscillation of the work robot.

In the above-described aspect, it is preferred that the measurement robot control unit detect the position of the target part by controlling the measurement robot to make the sensor follow the target part or the detection target.

According to this aspect, a change in the position of the distal end of the measurement robot or the sensor, which follows the target part, corresponds to a change in the position of the target part, which is moved by the conveyer device. Because the measurement robot control unit recognizes the position of the distal end of the measurement robot or the sensor, this configuration is advantageous for easily and reliably obtaining a change in the position of the target part.

In the above-described aspect, it is preferred that the measurement robot control unit detect the position of the target part by using the position of the sensor and the position of the target part with respect to the sensor.

In this configuration, the measurement robot control unit recognizes the position of the sensor. Thus, for example, the detected position of the target part with respect to the sensor is merely added, thereby making it possible to obtain the position of the target part, and the difference between detected positions before and after is obtained, thereby making it possible to obtain a change in the position of the target part. This is advantageous for easily and reliably obtaining a change in the position of the target part.

In the above-described aspect, it is preferred that the measurement robot control unit detect a change in the position of the target part by causing the measurement robot to make the sensor follow the detection target.

Furthermore, it is preferred that the measurement robot control unit detect a change in the position of the target part by using the position of the sensor and the detected position of the detection target with respect to the sensor.

In these aspects, the position of the target part is detected by causing the sensor to follow the detection target, whose position does not change with respect to the target part, or by detecting the detection target by means of the sensor. Thus, even in a case in which the target part is covered with the component or the tool, the position of the target part can be detected, and this is extremely advantageous for improving the accuracy of work performed by the work robot.

It is preferred that the above-described aspect further include a detection unit that detects at least the position of the object on the conveyer device, wherein the work robot control unit bring the component or the tool, which is supported by the work robot, close to the target part on the basis of a detection result of the detection unit; and the measurement robot control unit bring the sensor of the measurement robot close to the target part or the detection target on the basis of the detection result of the detection unit. Note that, at the time of making such approaches, the work robot may change the orientation of the component or the tool in accordance with the orientation of the target part, or the measurement robot may change the orientation of the sensor in accordance with the orientation of the target part or the detection target.

When the work robot and the measurement robot operate in this way on the basis of the detection result of the detection unit, the work efficiency is improved.

In the above-described aspect, it is preferred that, when the detected position of the target part or the detection target changes beyond a predetermined reference, at least one of the work robot control unit and the conveyer device perform an abnormality management operation.

In this aspect, as described above, in a state in which the positional relationship between the component or the tool, which is supported by the work robot, and the object is recognized, at least one of the work robot control unit and the conveyer device further performs the abnormality management operation on the basis of the detection result of the sensor. This configuration is advantageous for achieving reliable realization of prevention of damage to the work robot, the conveyer device, the object, etc., and is also advantageous for suppressing unexpected oscillation of the work robot.

According to a second aspect, the present invention provides a work robot including: an arm that performs predetermined work on a target part of an object conveyed by a conveyer device; a work robot control unit that controls the arm; and a force detector that detects a force generated by a contact between a component or a tool that is supported by the arm and the object, wherein the work robot control unit receives, from a measurement robot that has a sensor used for detecting a position of the target part, which is moved by the conveyer device, or a detection target whose position does not change with respect to the target part, data about the position; and, when the predetermined work is performed by the arm, the work robot control unit performs force control based on a detection value of the force detector, while performing control of the arm using the data about the position.

According to the aforementioned aspects, it is possible to efficiently realize prevention of damage to a robot, a conveyer device, an object, etc.

The invention claimed is:

1. A work robot system, comprising:
    a conveyer device that conveys an object;
    a work robot that performs predetermined work on a target part of the object;
    a work robot control unit that controls the work robot;
    a measurement robot;
    a sensor, disposed on the measurement robot, wherein the sensor detects a position of the target part or a detection target on the object, wherein the detection target on the object does not change with respect to the target part, and wherein the measurement robot moves the sensor;
    a measurement robot control unit that controls the measurement robot; and
    a force detector, disposed on the work robot, that detects a force of contact between a component or a tool supported by the work robot and the object,
    wherein, when the predetermined work is performed by the work robot, the work robot control unit controls the force of contact between the component or the tool and the object based on a detection value of the force and, while controlling the force, also controls a position of the work robot based on the detected position of the target part or the detection target.

2. The work robot system according to claim 1, wherein, while controlling the force, the work robot moves the component or the tool to follow the target part based on the detected position of the target part or the detection target.

3. The work robot system according to claim 1, wherein the measurement robot control unit detects the position of the target part by moving the sensor to follow the target part or the detection target.

4. The work robot system according to claim 1, wherein the measurement robot control unit detects the position of the target part by causing the measurement robot to move the sensor.

5. The work robot system according to claim 1, further comprising:
    a detection unit that detects at least a position of the object on the conveyer device,
    wherein the work robot control unit brings the component or the tool close to the target part based on a detection result of the detection unit; and
    the measurement robot control unit brings the sensor close to the target part or the detection target based on the detection result of the detection unit.

6. The work robot system according to claim 1, wherein, when the detected position of the target part or the detection target exceeds a predetermined reference, at least one of the work robot control unit and the conveyer device performs an abnormality management operation.

7. A work robot, comprising:
    an arm that performs predetermined work on a target part of an object conveyed by a conveyer device;

a work robot control unit that controls the arm; and a force detector that detects a force generated by a contact between the object and a component or a tool supported by the arm, wherein the work robot control unit receives, from a measurement robot comprising a sensor, data about a position of the target part or a detection target, wherein the detection target does not change with respect to the target part, and when the predetermined work is performed by the arm, the work robot control unit controls a force between the object and the component or the tool based on a detection value of the force, and, while controlling the force, also controls the arm using the data about the position of the target part or the detection target.

* * * * *